G. H. PERRY.
HYDRANT.
APPLICATION FILED JUNE 28, 1918.
1,335,526.
Patented Mar. 30, 1920.
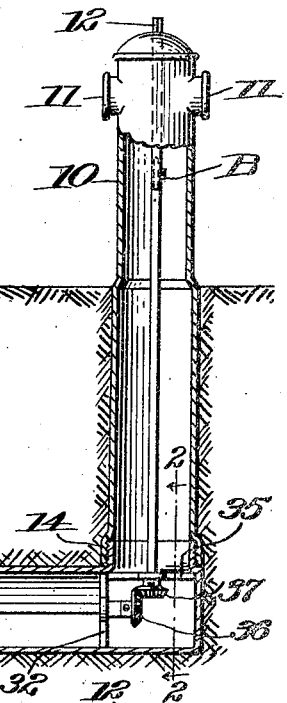
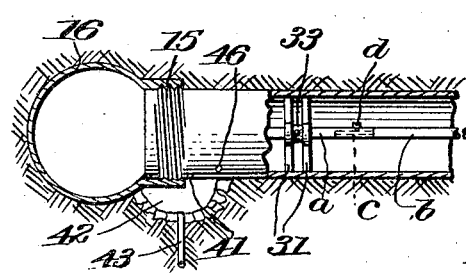
Inventor,
George H. Perry,
Attorneys

UNITED STATES PATENT OFFICE.

GEORGE H. PERRY, OF POTSDAM, NEW YORK.

HYDRANT.

1,335,526.  Specification of Letters Patent.  Patented Mar. 30, 1920.

Application filed June 28, 1918. Serial No. 242,459.

*To all whom it may concern:*

Be it known that I, GEORGE H. PERRY, a citizen of the United States, residing at Potsdam, in the county of Saint Lawrence and State of New York, have invented certain new and useful Improvements in Hydrants, of which the following is a specification.

My invention relates to a hydrant and the main object is to provide one in which the water will remain in the supply main and thus at a considerable distance from the outlet, when not flowing through the hydrant, so that the hydrant will be normally empty and free of such a quantity of water as may freeze therein to result in injury or impede and delay its operation.

While most of the servient objects will appear obvious and apparent as the description progresses, yet in addition to providing a "non-freezable" hydrant, I particularly aim to provide an apparatus of this type having a novel construction of inlet valve and operating means; one capable of manufacture in suitable sections to facilitate assembly and repair; one having an improved draining means and one generally improved in construction.

One embodiment carrying out the invention is shown in accompanying drawings, wherein—

Figure 1 is a view thereof, mostly in vertical section;

Fig. 2 is a detailed cross sectional view on the line 2—2 of Fig. 1;

Fig. 3 is an enlarged vertical section through the admission valve and a fragment of the distributing pipe;

Fig. 4 is a view of the parts of Fig. 3 but showing the valve in open position;

Fig. 5 is a cross sectional view on the line 5—5 of Fig. 4;

Fig. 6 is a cross sectional view through the admission valve and its operating means;

Fig. 7 is a detailed cross sectional view on the line 7—7 of Fig. 6, and

Fig. 8 is a cross sectional view on the line 8—8 of Fig. 4.

Referring particularly to the drawings, the hydrant casing which is shown at 10, is vertically disposed with its lower portion sunk into the ground and being hollow and substantially of pipe form as usual. One or more outlets are provided at 11, and the apparatus is to be operated by application of a crank or other tool to a rotatable shaft 12 projecting above the top of the casing shown in Fig. 1.

Below the surface of the ground, a horizontal distributing pipe 13 is provided and the casing 10 is screwed or otherwise detachably fastened thereto as at 14. The distributing pipe 13 is also screwed or otherwise detachably fastened as at 15 to the watermain shown at 16. By reason of the detachable connections 14 and 15, the hydrant and the distributing pipe may be detached from each other and from the main to facilitate repair, replacement or cleaning.

The admission of water from the main 16 into the supply pipe is controlled by the position of a valve A. This valve is generally cylindrical in shape and of skeleton formation, to this end having a cylindrical wall 17 provided with suitable openings 18 therethrough, through which the passage of the water into the distributing pipe 13 is facilitated. The outer end of the valve A is closed by a wall 19 which at its marginal edge overlaps the wall 17 and is beveled as at 20 in order to coöperate with a beveled seat 21 provided at the entrance end of pipe 13. When the valve A is in the position shown in Fig. 3, the supply of water into the distributing pipe and hydrant casing is cut off. However, when the valve is in the position shown in Fig. 4, the water may pass through the openings 18 and into the pipe 13 and hydrant.

In order that the valve A may assume the position of Fig. 4, it is essential that it have a sliding movement. To this end, a bracket is disposed within the valve consisting of a section 22 rigidly fastened to the valve and a section 23 detachably secured to the section 22 as by means of bolts 24. Each section 22 and 23 has a semi-circular socket portion 25 between which a ball 26 is journaled and fastened. The socket portions 25 as particularly shown in Fig. 7, have their inner faces arcuate so as to snugly fit the ball 26 as a result of which construction, the ball is mounted against detachment. This ball has an axial bore 27 provided with screw threads and through the bore a rod 28 extends, having screw threads to engage the screw threads of the ball. In order to prevent turning of the valve A relatively to the distributing pipe 13, a suitable means may be employed and to this end may consist of ribs 29 projecting inwardly from the distributing pipe 13 and entering grooves 30 in the periphery of the valve.

Rod 28 is preferably made in a plurality of sections, namely *a* and *b*, one section having a socket and the other section having a tenon *c* to extend thereinto and be clamped by means of a set screw *d*. By reason of this construction, the rod 28 may be lengthened or shortened as desired and readily detached. Rod 28 is mounted for rotation by means of bearings 31 and 32 provided within the pipe 13. Intermediate the bearings 31, a collar 33 is fixed to the rod 28, preferably removably, as by means of a set screw 34, so as to serve as an abutment to engage the bearings 31 and prevent movement of the rod 28 longitudinally of the pipe section 13.

The rod or shaft 12 may be made in a plurality of sections as the shaft 28, and employ exactly the same connecting and coupling means as said shaft at B. Shaft 12 is journaled in a bearing 35 rigidly mounted by the pipe sections 13 and connecting with the bearings 32. On the adjacent end of the rods 28 and 12, bevel gear wheels, respectively designated 36 and 37, are removably secured, meshing with each other.

It will thus be seen that as the shaft 12 is turned, its motion will be imparted to the shaft 28 through the medium of the double gears 36 and 37. The turning movement of shaft 28 by reason of the engagement of its screw threads with the screw threads of the ball 26, which ball therefore is in effect a nut, will slide the valve A to open or closed position according to the direction of turning. A pin 50 prevents the screw rod 28 disengaging the ball 26 when valve 19 moves to open position. The ball 26 prevents binding or tension between the valve A and pipe 13, should either become slightly misshapen or get out of true. Also in order to secure the best results under these conditions, the ball 26 should not be rigidly fastened. In order to hold the ball stationary at times when the valve is operated, sockets or cavities 38 and 39 respectively, preferably marginally round, are provided in the ball 26 and one of the sockets 25. The recess provided by the sockets 38 and 39 houses a bearing or ball 40 which binds against the socket 22 and the ball 26 to limit movement of the ball 26 and hold it rigid during operation of the hydrant.

After the valve A is closed pursuant to an operation, water remaining in the hydrant or distributing pipe may drain therefrom through an opening or port 41, into a pit 42 or any suitable means. The drained water may be piped as through the pipe 43, to any suitable location. Said port 41 is closed when the valve is open, that is in the position of Fig. 4. The valve for closing this port essentially comprises an arm 44 and an arm 45 joined together at one end and pivotally mounted on a rod 46 fastened to the distributing pipe 13. Arm 44 carries a valve head 47 which directly closes the port 41 while the arm 45 is adapted to project above a longitudinally extending arm 48 rigidly secured to the bracket 22. When the valve A is closed, arm 45 is in contact with the arm 48, being urged to that position by reason of a coil spring 49 fastened around the rods 46 with one end bearing against the pipe 13 and the other end bearing against the under surface of the arm 45. The port 41 is therefore open for draining purposes while the valve A is closed. As valve A moves to open position, it depresses arm 45 and accordingly moves valve head 47 into the port 41 to close it so that water will not escape through the port 41 as it flows through the hydrant.

Since merely the preferred embodiment of the invention has been illustrated and described, it is to be understood that changes in the details of construction may be resorted to without departing from its spirit and scope.

I claim:

1. A hydrant having an admission valve, a screw, a substantially spherical member mounted on said screw, a frame fixed to the valve and mounting said member, and said frame having an arcuate portion to maintain said member against displacement.

2. A hydrant having an admission valve, a screw, a screw threaded member engaging said screw, a frame for said member, a drain valve, and a means on said frame coöperating with the drain valve to shift the drain valve during its movement.

3. A hydrant having an admission valve, a screw, means to rotate the screw, a substantially spherical member engaging the screw, a frame having a section fixed to the valve, a removable section connected to the first mentioned section, said spherical member being mounted by said sections, one of said sections having an arcuate portion to mount the spherical member against displacement, a bearing intermediate the spherical member and one of said sections, an arm extending from one of said sections, and a drain valve in the path of movement of and coöperating with said arm.

4. A hydrant having a distributing pipe leading from the main, an admission valve, means to mount said valve for sliding movement within the pipe, coöperating means between the valve and pipe to prevent independent rotation of the valve and pipe, a rod, means to rotate the rod, bearings for the rod carried by said pipe, means intermediate the bearings to prevent movement of the rod longitudinally of the pipe, a frame carried by the valve, a ball mounted in said frame, means to permit limited rotation of the ball in said frame, said rod extending into the ball and having screw threads engaging screw threads of the ball.

5. In a hydrant having a cylindrical shaped admission valve, a frame fixed within the valve, a substantially spherical member mounted in the frame, and a screw passing through the said member to reciprocate the valve.

6. In a hydrant having a cylindrical shaped admission valve, a substantially spherical ball mounted within the valve, a screw rod passing through the ball, and means to prevent rotation of the valve.

In testimony whereof I have affixed my signature in the presence of two witnesses.

GEORGE H. PERRY.

Witnesses:
HENRY F. JUER,
HAMILTON R. CLOW.